United States Patent [19]

Donermeyer et al.

[11] 4,443,519

[45] Apr. 17, 1984

[54] BONDED PLASTIC STRUCTURES

[75] Inventors: Donald D. Donermeyer, Springfield; Joseph G. Martins, Ludlow; David A. Fabel, Springfield, all of Mass.

[73] Assignee: Monsanto Company, St. Louis, Mo.

[21] Appl. No.: 464,082

[22] Filed: Feb. 4, 1983

[51] Int. Cl.$^3$ .................... B32B 27/08; B32B 27/34; B32B 27/40; C09J 5/02

[52] U.S. Cl. .................... 428/336; 156/242; 156/311; 156/322; 156/327; 156/331.4; 428/214; 428/215; 428/346; 428/347; 428/423.1; 428/423.5; 428/423.7; 428/475.5

[58] Field of Search ............... 428/423.1, 423.5, 423.7, 428/336, 215, 214, 346, 347, 475.5; 156/331.4, 242, 311, 327, 322; 528/275

[56] References Cited

U.S. PATENT DOCUMENTS

| | | | |
|---|---|---|---|
| 3,650,999 | 3/1972 | Martins et al. | 428/423.1 |
| 4,031,164 | 6/1977 | Hedrick et al. | 528/275 |
| 4,053,682 | 10/1977 | Donermeyer | 428/480 X |

OTHER PUBLICATIONS

Derwent Abstract of Jap. 54149-781, Toyobo, Nov. 1979.

*Primary Examiner*—Thomas J. Herbert, Jr.
*Attorney, Agent, or Firm*—R. Bruce Blance; William J. Farrington; Paul D. Matukaitis

[57] ABSTRACT

A bonded plastic structure which comprises plastic parts of reaction injection molded polyurethane or reaction injection molded nylon coated with a primer coat and bonded together with a thermoplastic block copolymer. The primer coat comprises a moisture-curable polyisocyanate. The block copolymer comprises from 40 to 80 weight percent crystalline polyester or polyamide segments and 20 to 60 weight percent amorphous polyamide or polyether segments and has a crystalline melting point of at least 155° C. The bonded structure is adapted to survive the hot environment of paint curing ovens.

15 Claims, No Drawings

BONDED PLASTIC STRUCTURES

BACKGROUND OF THE INVENTION

The present invention is directed to bonded plastic structures and more particularly to structures comprising plastic parts bonded together with a hot melt adhesive block copolymer.

The bonding of plastics is generally accomplished with reactive multi-component thermoset systems such as peroxide cured unsaturated polyesters, polyol-polyisocyanate systems, and epoxy systems. Such systems require precise metering of the components to obtain uniform performance, they generally include toxic or sensitive compounds which need special precautions in handling, they have a finite open time requiring mating of the parts to be bonded before thre systems cure or advance to a non-bonding stage, their rate of cure is affected by the moisture content of the ambient air, they require that the bonded parts be held together mechanically for rather long times until the systems have cured sufficiently to provide a strong bond and they require cleaning or purging of the application equipment to avoid setting of the adhesive in the equipment.

Hot melt adhesives overcome such disadvantages since they are single component or single stream systems, their high molecular weight and chemical composition make them relatively non-toxic, they are not sensitive to shock, they develop bond strength simply by being cooled below their softening point and do not require long periods of mechanical fastening until cure has occurred and finally they do not present a problem caused by premature cure or set in the application equipment. However reinforced plastic structures manufactured from reinforced reaction injection molded polyurethane or reaction injection molded nylon are frequently subjected to elevated temperatures such as the temperatures used in paint ovens to cure surface coatings applied to the structures. To allow the bonded structures to survive such heat treatment, we have found that the hot melt adhesive should be a block copolymer comprising from 40 to 80% by weight of crystalline polyester or polyamide segments and from 20 to 60% by weight of amorphous polyamide or polyether segments, the block copolymer having a crystalline melting point above 155° C. and a number average molecular weight in the range of about 8,000 to about 30,000. Additionally we have found that to achieve adequate bond strength, the reinforced plastic parts should be coated with a thin layer of a primer coat comprising a moisture-curable polyisocyanate. The present invention is directed to such bonded structures, to the primed plastic parts and to the method of bonding the parts by coating them with the primer composition and applying the hot melt adhesive.

The plastic parts used in the present invention are reinforced reaction injection molded polyurethanes or reaction injection molded nylons. Reinforced reaction injection molded polyurethanes comprise high modulus polyurethane elastomers and from 15 to 30 weight percent glass fiber or particulate filler such as wollastonite. Reaction injection molded nylons are block polymers of the type disclosed in U.S. Pat. No. 4,031,164 and are prepared by reaction of a lactam-catalyst mixture with a lactam terminated polyether in a mold, or by reaction of a lactam-catalyst mixture with a blend of polyether polyol and a bisimide in a mold.

The primer coating system used in the present invention comprises a solution of a moisture-curable polyisocyanate in a low boiling organic solvent such as a hydrocarbon or a chlorinated hydrocarbon. Advantageously such polyisocyanates have an average isocyanate functionality in the range of about 2.2 to about 6 and include isocyanate terminated polyurethane prepolymers of number average molecular weight in the range of about 400 to about 4000 prepared by reaction of diisocyanates such as toluene diisocyanate, 4,4'-diphenylmethane diisocyanate, 4,4'-dicyclohexylmethane diisocyanate, hexamethylene diisocyanate or isophorone diisocyanate with the polyols, polyester polyols or polyether polyols conventionally used in the manufacture of such isocyanate terminated polyurethane prepolymers; they include polymethylene polyphenyl isocyanates; they include isocyanurate polyisocyanates of number average molecular weight in the range of about 500 to about 2000 obtained by oligomerization of diisocyanates or mixtures of diisocyanates; and they include oligomeric polyisocyanate-biurets of number average molecular weight in the range of about 400 to about 2000 obtained by reaction of diisocyanates with a limited amount of water. A small quantity of a conventional urethane catalyst can be added to the primer coating system, such as a tertiary amine, a zinc salt such as zinc octoate or an organotin compound such as dibutyltin dilaurate. The amount of catalyst used will be determined by the need to avoid overcure of the primer prior to application of the hot melt adhesive to the primed plastic part.

Prior to application of the primer coating, the plastic parts are advantageously cleaned with a low boiling hydrocarbon or chlorinated hydrocarbon to remove surface contaminants. The primer coating composition, as a dilute solution in hydrocarbon or chlorinated hydrocarbon solvent, is then wiped, brushed or sprayed on the plastic parts and allowed to dry preferably at room temperature to provide a thin continuous coating of dry primer preferably in a thickness range of about 5 to about 25 microns. The polyisocyanate concentration of the primer solution is generally in the range of about 2 to about 20 weight percent, and is preferably in the range of about 3 to about 10 weight percent. Indeed the application of such dilute solutions to the reinforced plastic parts by wiping can combine the removal of surface contaminants and the deposition of primer in one step. Depending upon the storage conditions, especially the ambient humidity, the primed parts may be stored for several days before they are bonded with molten thermoplastic. However, bonding is most conveniently effected within a few minutes after application of the primer coating.

The hot melt adhesive used for bonding the reinforced plastic parts to provide bonds resistant to subsequent heat exposure is a block copolymer comprising from 40 to 80 weight percent of crystalline polyester or polyamide segments and from 20 to 60 weight percent amorphous polyamide or polyether segments, the block copolymer having a crystalline melting point above about 155° C., preferably in the range of from 180° to 225° C. and a number average molecular weight in the range of about 8,000 to about 30,000. The glass transition temperature of the block copolymer, associated with the amorphous segments is generally less than 50° C., preferably in the range of about −50° to 40° C.

The crystalline polyester or polyamide incorporated into the block copolymer to provide the crystalline segments, advantageously has a number average molecular weight in the range of 1000 to 24000, preferably 1000 to 6,000, and a crystalline melting point of at least about 180° C. Preferably the melting point is in the range of from 200° to 270° C. These hard crystalline segments contribute tensile strength, toughness and high temperature performance to the block copolymer.

The crystalline polyester is a condensate of at least one aliphatic or alicyclic diol having from 2 to 10 carbon atoms and at least one aromatic dicarboxylic acid having from 8 to 20 carbon atoms, the diol and diacids being selected to provide polyesters in the desired melting point range. Representative diols include ethylene glycol, tetramethylene glycol, 1,4-cyclohexane diol and 1,4-cyclohexane dimethanol. Representative diacids include terephthalic acid, isophthalic acid and 2,6-, 2,7-, 2,8-, 1,4- and 1,5-naphthalene dicarboxylic acids. The preferred crystalline polyester is polyethylene terephthalate.

When the hard polyester segments comprise polyethylene terephthalate, a suitable molecular weight range of the polyester, prior to condensation with the polyamide segments, corresponds to an inherent viscosity range of about 0.05 to about 0.7 dl g$^{-1}$ determined at 25° C. with a solution of 0.5 g/100 ml in a solvent pair consisting of phenol and sym-tetrachloroethane in the weight ratio of 60:40. Preferably the inherent viscosity is in the range of about 0.1 to about 0.3.

The hard or crystalline polyamide segments of the block copolymer can be condensed from at least one aliphatic or alicyclic diamine having from 2 to 12 carbon atoms and at least one aliphatic or alicyclic dicarboxylic acid having from 2 to 12 carbon atoms selected to provide a polyamide with a melting point in the desired range. Examples of diamines include ethylene diamine, 1,3-propane diamine, 1,4-butanediamine, 1,5-pentane diamine, hexamethylene diamine, 1,10-decanediamine, cyclohexanediamine, etc. Examples of acids include oxalic, malonic, succinic, glutaric, adipic, pimelic, suberic, azelaic and sebacic acids. The hard or crystalline polyamide segments of the block copolymer can be obtained by polymerization of ω-aminocarboxylic acids containing from 2 to 10 carbon atoms such as aminoacetic acid, 3-aminopropionic acid, 4-aminobutyric acid, 6-aminohexoic acid, 10-aminodecanoic acid, etc. Polymerization of lactams such as ε-caprolactam provides a route to several of such polyamides. Among the preferred polyamides are poly(hexamethylene adipamide) and poly(ε-caprolactam).

The soft, amorphous or low melting segments of the block copolymer contribute wettability, elasticity and rubber character to the copolymer. They can be polyamide or polyether and are advantageously of weight average molecular weight in the range of about 300 to about 16,000 and possess a glass transition temperature less than about 50° C. and more preferably in the range of about −50° to about 40° C.

The amorphous polyamide segments can be prepared by condensing an aliphatic or alicyclic diamine having from 2 to 12 carbon atoms with a mixture of an aliphatic or alicyclic dicarboxylic acid having from 4 to 54 carbon atoms and at least 40 weight percent of an aliphatic dicarboxylic acid having from 18 to 54 carbon atoms. The preferred amorphous polyamide segments are prepared by condensing a C$_2$-C$_{10}$ diamine with a dimer acid containing from 75 to 98 weight percent of dimer and more preferably from 90 to 98 weight percent of dimer. Polyether segments are provided by poly(alkyleneoxy)diols such as poly(ethyleneoxy)diols, poly(propyleneoxy)diols and poly(tetramethyleneoxy)diols.

The block copolymers are prepared by a one step or two step method. In the one step method the components which form the hard or soft segments are polymerized in the presence of a prepolymer of the soft or hard segments respectively. In the two step method the hard segments and soft segments are prepared separately as prepolymers and then condensed together.

The melting point and glass transition temperatures are conveniently determined with a duPont differential thermal analyzer Model DTA 900 with the scanning calorimeter attachment, employing a 5 to 25 mg sample heated at a rate of 20° C. per minute, in a nitrogen atmosphere. The melt viscosity of the copolymer determined at a temperature of about 10° C. above the melting point of the copolymer and at a shear rate of 4 sec$^{-1}$ is advantageously in the range of 1000 to 3000 poise and is preferably in the range of about 1250 to about 2000 poise.

The most preferred group of block copolymers are block copoly(ester-amides) of the type described in U.S. Pat. No. 3,650,999 especially block copolyesteramides of polyethylene terephthalate or polybutylene terephthalate and a polyamide of an aliphatic primary diamine and dimer acid containing 75 to 90 weight percent dimer and more preferably 90 to 98 weight percent of dimer.

In bonding two reinforced plastic parts together to form a bonded structure, one of the primed parts is placed in a fixture adapted to hold it. Molten block copolymer is applied in a suitable pattern. The second primed part is applied against the molten thermoplastic deposited on the first part and a pressure of at least about 20 kPa is applied substantially uniformly over the bond, for example by clamping the parts together in the fixture. Preferably the pressure is maintained in the range of about 28 to about 85 kPa until the thermoplastic adhesive has cooled and set. The adhesive bond line is advantageously at least about 200 microns in thickness to accommodate surface unevenness and less than about 1500 microns to provide bonds of adequate strength at high temperatures. Advantageously the primed reinforced plastic parts may be heated to at least about 65° C. before the hot melt adhesive block copolymer is applied, and preferably the parts are heated to at least about 105° C. to increase the time that the adhesive remains in a molten bondable state after it has been applied to the reinforced plastic parts. The primed reinforced plastic parts should, however, not be maintained at such elevated temperatures for more than about 1 hour before the bonding step is carried out, to avoid overcure of the primer and adhesive failure of the bond at the primer-adhesive interface. After the bond is made, the bonded structure may be subjected to a temperature in the range of 20° to 170° C., preferably 90° to 135° C. for at least about 30 minutes to age the bond and to allow the primer coat to interact with the block copolymer and cure to chemically bond the block copolymer to the reinforced plastic parts. The aging temperature should be at least about 10° C. below the crystalline melting point of the block copolymer. While the molten block copolymer is generally applied from the applicator to just one of the parts to be bonded, higher bond strength can sometimes be obtained by application of the molten adhesive to both parts prior to mating them to form the bond. Bond strengths are determined by AST Method D-1000-72 upon 25 mm square overlaps of test coupons 25.4×101 mm. The bond is considered to have attained maximum strength if failure occurs in the substrate and not at the bond interface.

The following examples are set forth to illustrate the invention and should not be construed as a limitation thereof. Unless otherwise indicated, all parts and percentages are by weight.

EXAMPLE 1

Coupons (25.4×101×2.72 mm) of reinforced plastic prepared from a reinforced reaction injection molded polyurethane containing 20 weight percent glass fiber was wiped with a toluene soaked cloth to remove surface contaminants. A 6 weight percent methylene chloride solution of a primer composition of average isocyanate functionality of about 3, consisting of a 1:1 mixture of polymethylene polyphenyl isocyanates sold by the Upjohn Company under the tradenames PAPI 20 and PAPI 135 was applied to the bonding surfaces of the coupons to provide a thin continuous film of dry primer composition.

A block copolyesteramide containing 70 weight percent polyethylene terephthalate and 30 weight percent of a polyamide condensed from 116 parts of hexamethylene diamine and 725 parts of dimer acid containing 90 weight percent dimer, was prepared by condensing with the polyamide a polyethylene terephthalate of inherent viscosity 0.16 dl g$^{-1}$, determined at 25° C. with a solution of 0.5 g/100 ml in a solvent pair of phenol and symmtetrachloroethane in the weight ratio of 60:40. The crystalline melting point of the block copolyesteramide was 205° C., the inherent viscosity was 0.56 dl g$^{-1}$ and the melt viscosity at 216° C. and a shear rate of 4 sec.$^{-1}$ was 1180 poise.

The block copolyesteramide was melted in a hot melt applicator and the molten adhesive was applied to a 25.4 mm square of a primed coupon of the reinforced plastic. A second primed coupon was applied to the molten copolyesteramide and clamped to the first coupon under a pressure of 69 kPa for 1 minutes. After 1 hour at room temperature the bond was subjected to a tensile shear test by AST Method D-1000-72. The bond strength was 3100 kPa with substrate failure of the reinforced plastic interface. Similar bonding tests were carried out with an isocyanate terminated polyurethane prepolymer sold by Synthetic Surfaces Inc. under the tradename Tie Coat #59. After one hour at room temperature, the bond strength was 3030 kPa with substrate failure of the reinforced plastic. No change in bond strength occurred with aging at 135° C. for 20 minutes. When unprimed coupons were bonded under these conditions, the tensile strength of the bond was 2070 kPa with adhesive failure of the bond.

When the coupons were primed with an epoxidized novolac resin, an epoxidized novolac-amido polyamine system, an epoxy-amidopolyamine system or an acrylic primer, and bonded with a hot melt adhesive and aged for 45 minutes at 135° C., tensile strengths in the range of 960 to 3310 kPa were obtained with adhesive failure of the bond between the primer and the substrate. No substrate failure occurred, showing that these primers were inadequate to provide the desired bond strength to the reinforced plastic structure.

EXAMPLE 2

Coupons (25.4×101×2.72 mm) of a reaction injection molded nylon were primed with the polymethylene polyphenyl isocyanates and the isocyanate terminated polyurethane prepolymer of Example 1. The primed coupons were bonded with the block copolyesteramide as described in Example 1. After the coupons were aged for one hour at room temperature, the bond strengths were respectively 3100 and 3310 kPa with substrate deformation.

What is claimed is:

1. A bonded plastic structure which comprises plastic parts coated with a primer coat and bonded together by a thermoplastic block copolymer wherein the plastic is a reinforced reaction injection molded polyurethane or a reaction injection molded nylon, wherein the primer coat comprises a moisture-curable polyisocyanate, wherein the block copolymer comprises from 40 to 80% by weight of crystalline polyester or polyamide segments and from 20 to 60% by weight of amorphous polyamide or polyether segments, and wherein the block copolymer has a crystalline melting point above about 155° C. and a number average molecular weight in the range of about 8000 to about 30,000.

2. The bonded structure of claim 1 wherein the primer coating thickness is in the range of about 5 to about 25 microns.

3. The bonded structure of claim 1 wherein the moisture-curable polyisocyanate has an isocyanate functionality in the range of about 2.2 to about 6 and is selected from the group consisting of isocyanate terminated urethane prepolymers of number average molecular weight in the range of about 400 to about 4000, polymethylene polyphenyl isocyanates, isocyanurate polyisocyanates of number average molecular weight in the range of about 500 to about 2000 and oligomeric polyisocyanate-biurets of number average molecular weight in the range of about 400 to about 2000.

4. The bonded structure of claim 1 wherein the crystalline segments of the block copolymer are polyethylene terephthalate or polybutylene terephthalate and the amorphous segments comprise a polyamide condensation product of a dimer acid containing from 75 to 98 weight percent dimer and an aliphatic primary diamine containing from 2 to 10 carbon atoms.

5. The bonded structure of claim 4 wherein the crystalline segments of the block copolymer comprise polyethylene terephthalate.

6. A primed plastic part adapted to be bonded with a hot melt adhesive, wherein the plastic part is a reinforced reaction injection molded polyurethane or a reaction injection molded nylon and wherein the primer coat comprises a moisture-curable polyisocyanate.

7. The primed plastic part of claim 6 wherein the moisture-curable polyisocyanate has an isocyanate functionality in the range of about 2.2 to about 6 and is selected from the group consisting of isocyanate terminated urethane prepolymers of number average molecular weight in the range of about 400 to about 4000, polymethylene polyphenyl isocyanates, isocyanurate polyisocyanates of number average molecular weight in the range of about 500 to about 2000 and oligomeric polyisocyanate-biurets of number average molecular weight in the range of about 400 to about 2000.

8. A process for bonding a first plastic part to a second plastic part, which comprises applying a primer coating solution to the bonding surfaces, evaporating solvent from the primer coating to provide a film of dry primer, placing the first plastic part in a fixture adapted to hold the first plastic part, applying a molten thermoplastic adhesive to the primed surface of the first plastic part, mating the second plastic part to the first plastic part to form a bond, retaining the second plastic part in the fixture against the first plastic part by application of a pressure of at least 20 kPa substantially uniformly over the bond, and cooling the bonded parts to allow the bond to set, wherein the plastic parts are reinforced reaction injection molded polyurethane or reaction injection molded polyamide, wherein the primer coating comprises a moisture-curable polyisocyanate, wherein the thermoplastic adhesive is a block copolymer comprising 40 to 80 wt % crystalline polyester or polyamide segments and from 20 to 60 wt % amorphous polyamide or polyether segments, and has a crystalline melting point above 155° C. and a number average molecular weight in the range of about 8000 to about 30000.

9. The process of claim 8 wherein the moisture-curable polyisocyanate has an isocyanate functionality in the range of about 2.2 to about 6 and is selected from the group consisting of isocyanate terminated urethane prepolymers of number average molecular weight in the range of about 400 to about 4000, polymethylene polyphenyl isocyanates, isocyanurate polyisocyanates of number average molecular weight in the range of about 500 to about 2000 and oligomeric polyisocyanate-biurets of number average molecular weight in the range of about 400 to about 2000.

10. The process of claim 8 wherein the primer coating thickness is in the range of about 5 to about 25 microns and wherein the thickness of the thermoplastic adhesive bond is in the range of about 200 to about 1500 microns.

11. The process of claim 8 wherein the moisture-curable polyisocyanate has an isocyanate functionality in the range of about 2.2 to about 6 and is selected from the group consisting of isocyanate terminated urethane prepolymers of number average molecular weight in the range of about 400 to about 4000, polymethylene polyphenyl isocyanates, isocyanurate polyisocyanates of number average molecular weight in the range of about 500 to about 2000 and oligomeric polyisocyanate-biurets of number average molecular weight in the range of about 400 to about 2000, wherein the crystalline segments of the block copolymer comprise polyethylene terephthalate and the amorphous segments comprise a polyamide condensation product of a dimer acid containing from 90 to 98 weight percent dimer and an aliphatic primary diamine containing from 2 to 10 carbon atoms, wherein the primed plastic parts are preheated to at least 105° C. before the molten thermoplastic adhesive is applied, wherein the applied pressure is in the range of about 28 to about 85 kPa, and wherein the bond is aged at a temperature in the range of about 90° to about 135° C. for at least about 30 minutes.

12. The process of claim 8 wherein the primed plastic parts are preheated to at least 65° C. before the molten thermoplastic adhesive is applied, wherein the applied pressure is in the range of about 28 to about 85 kPa and wherein the bond is aged at a temperature in the range of about 20° to about 170° C. for at least about 30 minutes.

13. The process of claim 12 wherein the preheat temperature is at least about 105° C. and the aging temperature is in the range of about 90° to about 135° C.

14. The process of claim 8 wherein the crystalline segments of the block copolymer comprise polyethylene terephthalate or polybutylene terephthalate and the amorphous segments comprise a polyamide condensation product of a dimer acid containing from 75 to 98 weight percent dimer and an aliphatic primary diamine containing from 2 to 10 carbon atoms.

15. The process of claim 14 wherein the crystalline segments of the block copolymer comprise polyethylene terephthalate.

* * * * *